March 8, 1966   L. C. LOT ETAL   3,239,220
DOCUMENT CONVEYOR

Filed Jan. 2, 1964   5 Sheets-Sheet 1

INVENTOR.
LEON C. LOT
RALPH R. TILLY
BY
ATTORNEY

INVENTOR.
LEON C. LOT
RALPH R. TILLY
BY
ATTORNEY

INVENTOR.
LEON C. LOT
RALPH R. TILLY
BY
ATTORNEY

March 8, 1966 L. C. LOT ETAL 3,239,220
DOCUMENT CONVEYOR
Filed Jan. 2, 1964 5 Sheets-Sheet 5

INVENTOR.
LEON C. LOT
RALPH R. TILLY
BY
ATTORNEY

United States Patent Office 3,239,220
Patented Mar. 8, 1966

3,239,220
DOCUMENT CONVEYOR
Leon C. Lot, Webster, and Ralph R. Tilly, Ontario, N.Y., assignors to Xerox Corporation, Rochester, N.Y., a corporation of New York
Filed Jan. 2, 1964, Ser. No. 335,158
4 Claims. (Cl. 271—75)

This invention relates to document conveying apparatus and, particularly, to apparatus used to convey documents past a scanning station in a flow-type copying camera.

More specifically, the invention relates to apparatus for holding a document on a conveyor in a flat position so that the conveyor may carry the document past a scanning station at a constant speed. Heretofore, document hold-down devices used in conjunction with document conveyors, have consisted of either a plurality of elongated rollers in contact with the document conveyor, or a plurality of additional belts mounted adjacent to the conveyor in contact with the conveyor belt so that the document is caught between two belts for movement through the system.

When a series of elongated rollers are used in conjunction with the conveyor belt, there is always the possibility that a wrinkled or curved document will adhere to the roller and be conveyed upward between adjacent rollers, thus jamming or tearing the document.

The rollers usually consist of a shaft with a heavy rubber layer around the shaft and extend across the width of the conveyor in contact with the conveyor belts. This type of roller is very heavy and is rotated by the frictional contact with the moving conveyor belts. The excess weight of the rollers produces a large additional load on the drive system of the conveyor. Also when a document, particularly documents of heavy material, pass a scanning station and first encounter the guide rollers there is difficulty in passing between the roller and the conveyor belt. The document in attempting to compress the rubber on the roller tends to stop momentarily producing an irregular movement past the scanning station. This irregular movement produces defects in the reproduced copy.

In multiple belt systems the hold-down belts are also driven by the frictional contact with the conveyor belt and also produce a high load on the conveyor drive system. The top belt system is also relatively heavy and must be deflected upwards by the document, producing irregular movement of the document past the scanning station.

It is, therefore, the primary object of this invention to improve document conveyors so that a document being carried on a conveyor will move at a constant speed.

It is a further object of this invention to improve document conveyors so that a document being carried on a conveyor will not be crushed or torn.

It is also an object of this invention to reduce the weight of document hold-down devices used on document conveyors and in turn reduce the load on the conveyor drive system.

It is also an object of this invention to improve document conveyors so that documents of various thicknesses may be transported on the conveyor without producing irregular movement of the document.

These and other objects of this invention are attained by means of a series of highly resilient discs, preferably constructed of a material such as polyurethane, center mounted on a series of shafts which span the conveyor belt of a document conveyor system. The disc shaped members are staggered along the length of the shafts so that the disc members are in rolling contact with the individual belts of the conveyor and extend between the disc members on the adjacent shafts, thus insuring that as a document passes on the conveyor belts, beneath the disc shaped members, the document cannot curl or follow the disc-shaped members upward out of the flow path. If the document tends to curl around the disc shaped member, the disc members on the next adjacent shaft will tend to force the document back onto the conveyor belt and continue it along its normal path.

The disc-shaped members are constructed of a light weight material so that they do not add an appreciable mass to the system or load on the drive system. The shafts supporting the disc-shaped members are mounted to be freely moveable, or float, so that the entire roller may adjust its position to accommodate various thicknesses of document.

For a better understanding of the invention as well as other objects and further features thereof, reference is had to the following detailed description of the invention to be read in connection with the accompanying drawings wherein.

Figure 1:
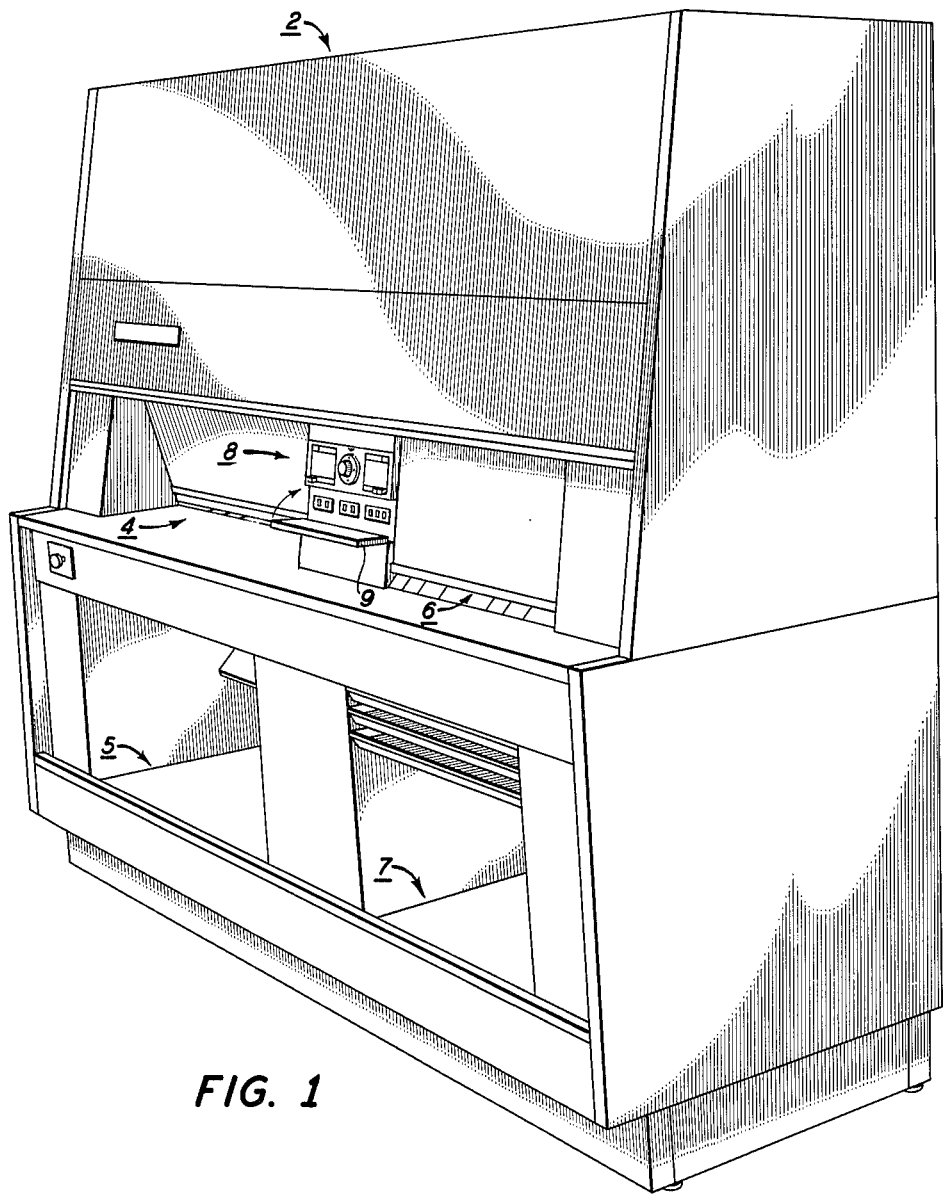
FIG. 1 is a right-hand perspective view of the xerographic apparatus of the invention enclosed in a cabinet.

A xerographic reproducing apparatus 2 with the cover panels in place is shown in FIG. 1. A document feed-in station is shown at 4 and a front document return bin is shown at 5. There is a copy sheet feed station 6 and a copy discharge bin at 7. There is a control panel 8, and a cover 9 which may be closed to partially cover part of the control panel.

Figure 2:
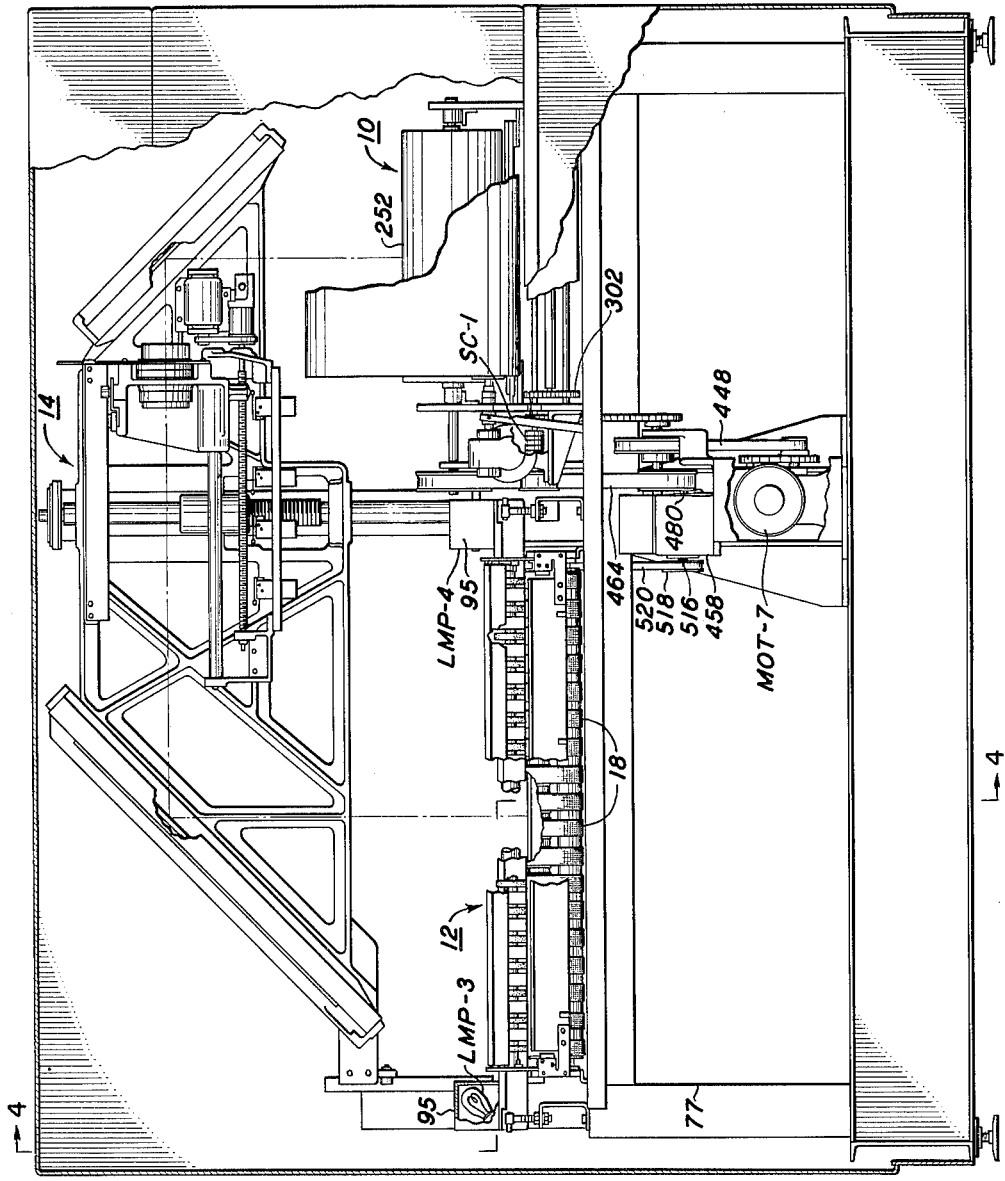
FIG. 2 is a front view of the apparatus with the cabinet covers broken away to show the internal structure of the machine.

FIG. 2 shows a front view of the machine with the covers broken away to show the internal structure of the xerographic apparatus 10, the document conveying apparatus 12, and the optic system 14.

Document conveyor

Figure 3:
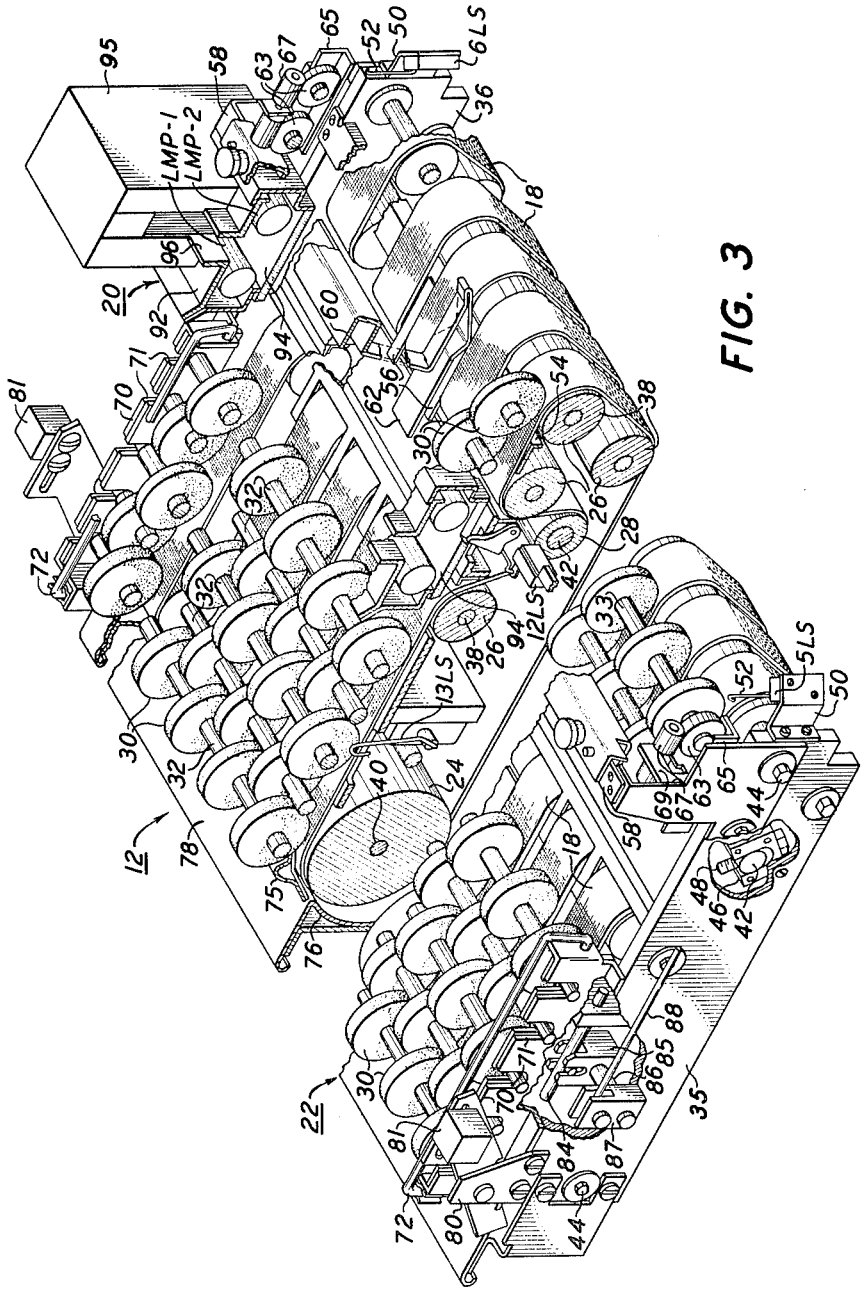
FIG. 3 is a left-hand perspective view of the conveyor system used in the apparatus shown in FIG. 1.
Figure 4:
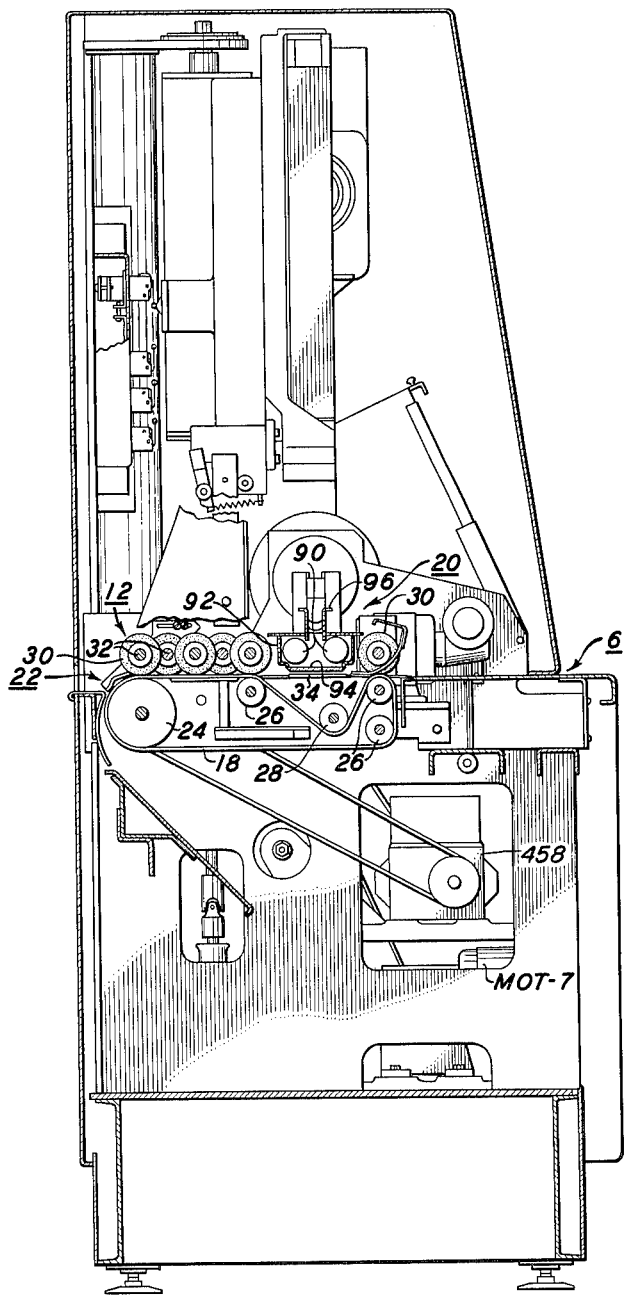
FIG. 4 is a sectional view of the apparatus taken along lines 4—4 of FIG. 2.

The document conveyor 12 is seen in FIGS. 2, 3 and 4. An original document of either transparent or opaque material is fed into the conveyor system at feed-in station 4 and is carried on conveyor belts 18 past scanning station 20 to a discharge point 22.

The conveyor belts 18 consist of a series of continuous belts driven by a drive roll 24 around a series of idler rolls 26 and a tensioning roll 28. Mounted above and in contact with the individual strands of conveyor belts 18 are a series of rollers consisting of polyurethane discs 30 mounted in a staggered arrangement on a series of guide rollers or shafts 32 and 33. The polyurethane discs hold the document down on the conveyor belts 18 for movement through the conveyor system. A document fed into the conveyor at feed-in station 4 is gripped between the belts 18 and the first two sets of polyurethane discs 30 and moved forward across a platen 34 at exposure station 20. A document, after passing over platen 34, is again picked up by conveyor belts 18 and the polyurethane discs 30 and transported to the discharge station 22. The platen 34 has a reflective or flat white surface to reflect light that has passed through a document back through the document to reinforce the light image reflected from the document surface.

Two conveyor frame members 35 and 36 provide support for the shafts 38 supporting the idler rollers 26, shaft 40 supporting the drive roll 24, and shaft 42 supporting the tensioning roller 28. The shafts 38 and 40 are mounted in bearing assemblies 44 inside frame members 35 and 36. The shaft 42 supporting the tensioning roller 28 is mounted in a slotted adjustment block 46 mounted on the side frame members. A bolt 48 passes through the block 46 and the shaft 42 and serves to position the shaft to adjust the tension on the belts 18.

Mounted on the front of the side frame members 35 and 36 are a pair of brackets 50 supporting a pair of misfeed switches 5LS and 6LS. Actuating arms 52 extend upward from the switches and, as described below, serve to stop the conveyor if a document is misfed in such a manner as to contact either actuating arm 52, thus insuring proper alignment of a document fed into the conveyor system. A plate 54 extends across and under the conveyor belts 18 and has a series of finger-like extensions 56 which extend between the individual strands of the conveyor belt onto the platen 34. The finger-like extensions 56 are below the upper surface of the belts 18 so that a document inserted in the machine is picked up by the conveyor 18 and then is carried forward on the finger-like extensions onto the surface of the platen 34. Basically, the finger-like extensions 56 insure that the document does not follow the conveyor system beneath the surface of the platen, but, rather, guide the document up onto the surface of the platen. Mounted above the conveyor belts, on brackets 58, is document guide 60. The document guide 60 contains finger-like members 62 which extend between the polyurethane rollers onto the surface of the platen; thus, as the document passes between the conveyor belts 18 and the polyurethane rollers 30, it is then guided between the finger-like members 56 on the plate 54 and the finger-like member 62 on the document guide 60.

As seen in FIG. 3 the shafts 33 containing the polyurethane discs 30 mounted at the front to the conveyor are supported at each end in bearings 63 supported on brackets 65 on the side frames 35 and 36. The bearings 63 are ball bearings held in place on brackets 65 by means of a resilient pressure member 67 fitted in a groove 69 in bracket 65.

The resilient pressure member 67 is forced into the groove 69 so that it forces downward on the top of the bearings 63 to hold the bearings in seats cut in the bracket 65. According to this type of construction the shafts 33 are held rigid and the varying thickness of documents being reproduced is accommodated by the resiliency of the polyurethane discs.

The shafts 32 containing the polyurethane discs 30 located in the rear of the conveyor, that is after the exposure station 20, are journaled at each end in brackets 70. The brackets 70 have a series of slots 71 which accommodate the shafts 32 and provide a bearing surface on which the shafts may rotate. The shafts 32 are held in slots 71 by their own weight and are free to float or rise off the bearing surface as various thicknesses of documents pass beneath the discs and the conveyor belts. A restraining bar 72 is pivotally mounted in the brackets 70 above the shafts 32 in insure that the shafts do not jump out of the slots 71. The restraining bars 72 may be pivoted to a position wherein the shafts 32 may be manually removed from the brackets 70 for maintenance purposes.

The floating aspect of the shafts 32 permits various thicknesses of documents to be moved on the conveyor with the same pressure being applied to the document. It is not necessary, as in conventional devices, that the thickness of the document be accommodated merely by the resiliency of the guide or pressure rollers. This particular aspect assures a uniform movement of the document on the conveyor so that the movement of the document past the scanning station is always at constant rate. In conventional rollers where a heavy rubber is used and the shafts are normally fixed in a bearing, the thickness of the document is accommodated by the resiliency of the roller thus for varying thicknesses the amount of the pressure applied by the roller varies with the thickness of the document. Thus the amount of pressure between the belts and the document may vary depending on the thickness of the document and in the case of heavier documents there is apt to be a hesitation in the movement of the document as the document passes the exposure station and contacts the first set of guide rollers.

Each of the polyurethane discs are positioned along the shafts 32 so that one disc is in contact with each belt strand and covers less than half of the belt strand. The discs on adjacent shafts are in contact with different portions of the belt surface and the discs are of a diameter of sufficient size that they extend into the area covered by the discs on adjoining shafts. There is no space or gap between rollers. Thus a document cannot curl around the rollers. As the document starts to follow one roller upward away from the conveyor it will be directed downward by the next set of rollers.

The discs are rotated by the conveyor system through the frictional contact with the belt strands. However, the polyurethane is extremely light weight and does not add appreciably to the load on the conveyor system.

Figure 5:
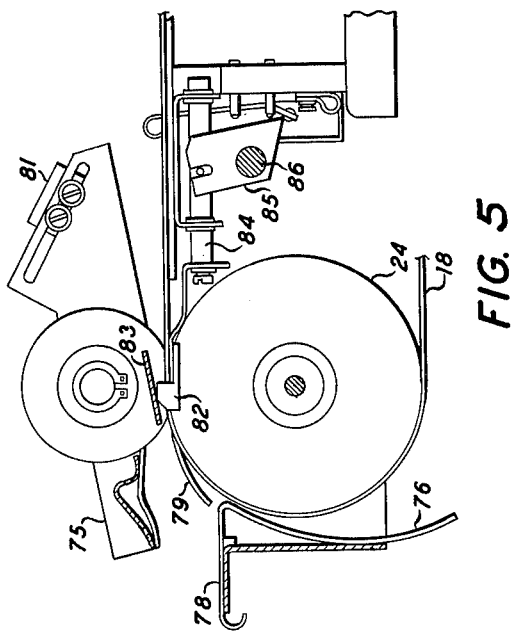
FIG. 5 is an enlarged side view of the conveyor discharge station.

At the rear of the conveyor at discharge station 22, there is a manually operable document deflector 75 which permits a document to be discharged from the conveyor either to the front of the machine or straight out the back of the machine. As seen in FIG. 3, when the deflector 75 is down, a document will be deflected from the front surface of the deflector downward between the roller 24 and a guide plate 76 so that it is discharged into the document tray 77 in return bin 5 at the front of the machine. If the document being reproduced is of heavy, non-flexible materal which will not readily bend around the roller 24 for discharge in the front of the machine, then the document deflector 75 is elevated, as shown in FIG. 5, so that the document may proceed directly out the rear of the machine on platform 78. A resilient member 79, containing fingerlike extensions which extend between the belt strands, prevents the document from following the belts 18 around the roller 24. When the deflector 75 is in a closed position, the resilient member 79 is held down against the roller 24.

The deflector 75 is mounted on a pair of brackets 80 secured to the side plates 35 and 36 and contains counterweights 81 to facilitate movement of the deflector from a closed to an open position. Actuation of the deflector 75 is accomplished through a wedge 82 which, when moved toward the rear of the conveyor, forces a tab 83 on the deflector 75 to rotate the deflector to an open position. The wedge shaped cam 82 is actuated through a linkage consisting of an arm 84 actuated by a pivot block 85 secured to a shaft 86. The shaft 86 is secured in the side plate 35 and is rotated by movement of an arm 87 attached to a linkage member 88 which extends to the front of the machine to be manually actuated by an operator. Pushing the linkage 88 toward the rear of the machine forces the wedge shaped cam 82 back against the document deflector 75, raising the deflector and permitting the document to pass outward through the rear of the machine. Moving the linkage member 88 toward the front of the machine pulls the wedge shaped cam 82 away from the deflector 75 permitting the deflector to fall to a position wherein it will deflect the document downward against the guide plate 76 so that it will be accessible in the document bin 5 in the front of the machine.

As best seen in FIGS. 3 and 4, there are a pair of fluorescent lights LMP-1 and LMP-2 mounted directly above the platen 34 and encased in a housing 92. In the bottom of the housing 92, directly beneah the fluorescent lights LMP-1 and LMP-2, is a glass plate 94 and, in the middle top of the housing 92, there is a light tunnel 96. The two fluorescent lights are spaced apart so that as a document passes over the platen 34, light is reflected down through the glass plate 94 onto the surface of the document and reflected from the document or from the reflective surface of the platen 34 upward through the glass plate 94 through the light tunnel 96 to the optic system of the apparatus. Two additional lights, LMP-3 and LMP-4, are mounted on the sides of the conveyor and act as fill-in lamps to illuminate the edges of large documents. The lamps are encased in housings 95, as seen in FIG. 2.

*Drive system*

FIGS. 2 and 4 show the drive system for the conveyor, the optics, and the xerographic equipment. The motor MOT-7 is the main drive motor of the apparatus and supplies power to drive the xerographic drum 252, the xerographic chain conveyor 302, the document conveyor drive roll 24, and the optical assembly 14. The motor MOT-7 is mounted at the bottom of the machine on a support bracket mounted on the main frame.

Power is supplied from the motor MOT-7 through belt 448, the xerographic drum drive belt 464 to the input shaft 480 of the document drive transmission 458. The output shaft 516 of the document drive transmission is seen in FIG. 2, and has pulley 518 mounted thereon. A belt 520 transmits power from the document drive transmission 458 to the document drive roll 24 which moves the belt system of the conveyor 12, as previously described, to carry a document through the exposure station. The movement of a document through the document conveyor 12 must be proportional in speed to the movement of the xerographic drum 252. That is, assuming a one-for-one size reproduction of a document, the conveyor would have to move the document at the same linear speed as the surface of the xerographic drum 252. Assuming that there were to be fifty percent reduction in the size of the copy from the original document, the document conveyor would necessarily move at twice the speed of the linear movement of the surface of the xerographic drum. Therefore, the document drive transmission must accurately synchronize the movement of the xerographic drum and the conveyor system and must be capable of selectively producing variation in the ratio of the document speed to the drum speed.

A document drive transmission of the type suitable for use herein is disclosed in copending application, Serial No. 299,416, filed August 1, 1963, in the names of E. D. Hewes, R. R. Tilly, and J. O. Wilson.

While the invention has been described with reference to the structures disclosed herein, it is not confined to the details set forth, and this application is intended to cover such modifications or changes as may come within the purposes of the improvements or the scope of the following claims.

What is claimed is:

1. A document conveyor including:
   a plurality of continuous parallel conveyor belts mounted on a series of belt guide rollers and defining a document flow path;
   drive means for driving the conveyor belts;
   a plurality of document guide rollers spanning the conveyor belts adjacent to the document flow path;
   and a plurality of resilient disc-shaped members center mounted on each document guide roller in spaced relation along the length of the document guide roller according to the position of the conveyor belts;
   each of said disc-shaped members being in contact with a conveyor belt to be rotated thereby;
   said document guide rollers being spaced in close proximity so that the disc-shaped members extend beyond the periphery of the disc-shaped members on adjacent rollers.

2. A document conveyor including:
   a pair of side frames;
   a plurality of belt guide rollers mounted in the side frames;
   a plurality of continuous parallel belts mounted around the guide rollers to define a document flow path;
   drive means operatively connected to one of the belt guide rollers to drive the conveyor belts;
   a plurality of document guide rollers spanning the conveyor belts adjacent to the document flow path and rotatably mounted in the side frames;
   said document guide rollers being freely movable in the side frames in a direction substantially perpendicular to the document flow path;
   and a plurality of resilient, disc-shaped members center mounted on each document guide roller in spaced relation along the length of the guide roller according to the positions of the conveyor belts;
   said disc-shaped members being in contact with a portion of the surface of the conveyor belts to be rotated thereby;
   said document guide rollers being spaced a distance one from the other so that the disc-shaped members on each roller extend beyond the periphery of the disc-shaped members on adjacent rollers.

3. A document conveyor for use in a continuous flow copying machine wherein a document is moved past a scanning station at a uniform speed including:
   a pair of side frames;
   a conveyor belt system consisting of a plurality of individual conveyor belts mounted on rollers supported in the side frames to define a document flow path;
   one of said rollers being adjustably supported by the side frames to permit lateral movement of the roller and tensioning of the conveyor belts;
   a platen supported by the side frames and spanning the conveyor belts so that the conveyor belts pass beneath the top surface of the platen said conveyor belts being substantially in the same plane as the top surface of the platen immediately before the platen and after the platen, so that the document flow path is over the top of the platen;
   a plurality of document guide rollers mounted adjacent to the conveyor belts in the document flow path; and
   a series of resilient disc members mounted in spaced relation along the length of the document guide rollers with the periphery of each disc in contact with an individual conveyor belt;
   said discs being of sufficient size so that the discs on each roller extend beyond the periphery of the discs on adjacent rollers.

4. A conveyor for use in a continuous flow copying machine wherein a document is moved past a scanning station at a uniform speed including:
   a pair of side frames;
   a conveyor belt system consisting of a plurality of individual parallel conveyor belts;
   a plurality of belt rollers supported by the side frames and arranged to define a flow path for the conveyor belts;
   a plurality of slots in the side frames substantially perpendicular to the flow path of the conveyor belts;
   a plurality of document guide rollers spanning the conveyor belt system and mounted in the slots in the side frames to be freely movable therein in a direction substantially perpendicular to the flow path of the conveyor belt;

a series of resilient disc-shaped members mounted in spaced relation along the length of the document guide rollers with the periphery of each disc in contact with an individual conveyor belt;

said discs being staggered and of sufficient size so that the discs on each roller extend beyond the periphery of the discs of adjacent rollers.

References Cited by the Examiner

UNITED STATES PATENTS

| | | | |
|---|---|---|---|
| 2,949,002 | 8/1960 | Zwarycz | 271—75 |
| 3,116,823 | 1/1964 | Schneider | 198—127 |

M. HENSON WOOD, JR., *Primary Examiner.*

WILLIAM B. LABORDE, *Examiner.*